Oct. 12, 1965  G. H. SLAGLE  3,211,440
VAPORIZING APPARATUS FOR GENERATING A PROTECTIVE
ATMOSPHERE FOR A FURNACE AND THE LIKE
Filed Jan. 15, 1962  2 Sheets-Sheet 2
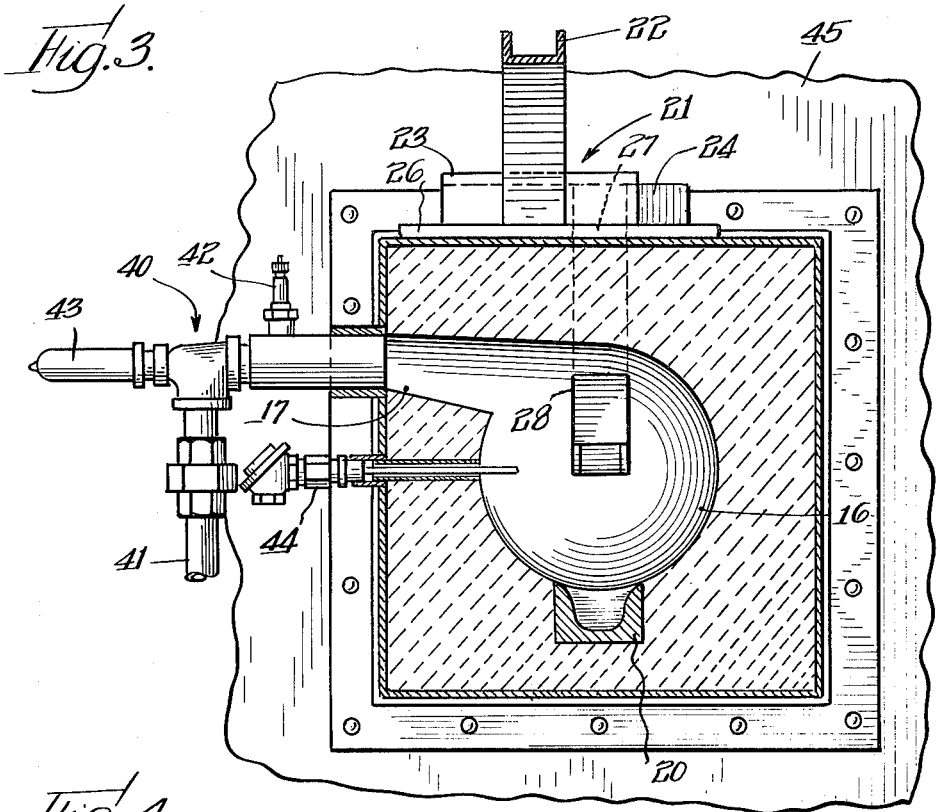
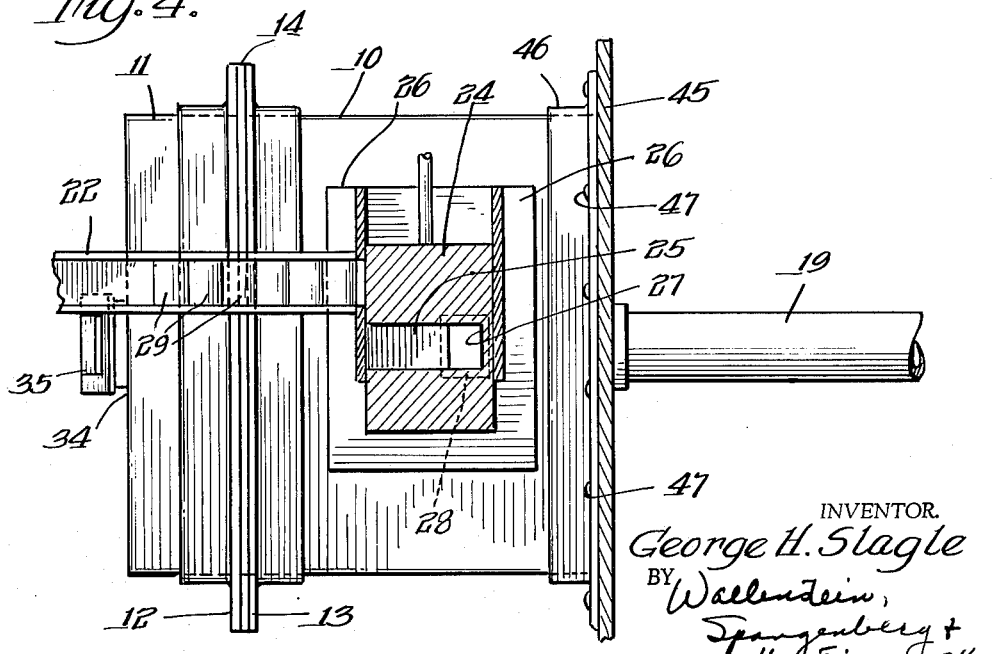
INVENTOR.
George H. Slagle

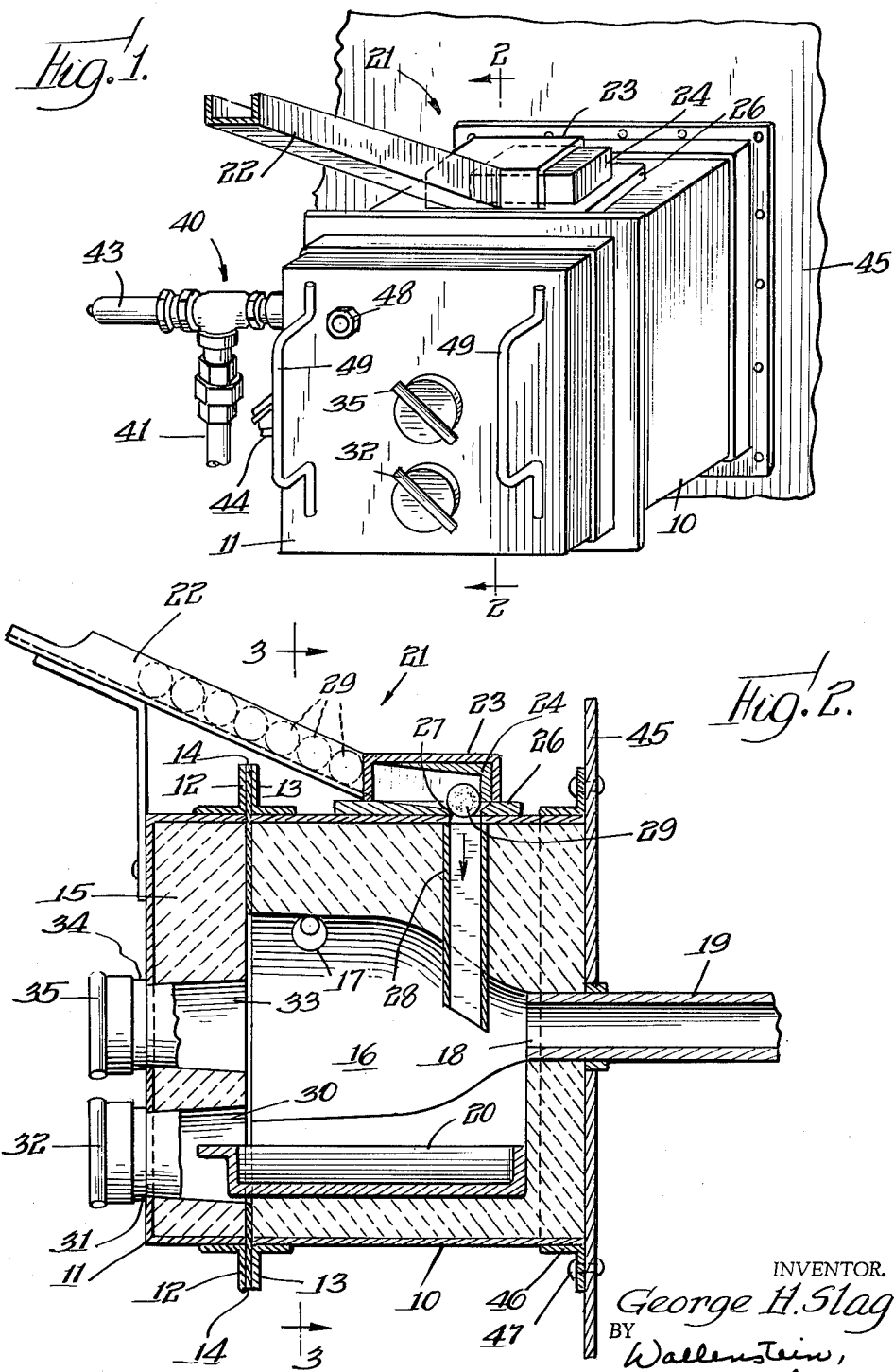

United States Patent Office 3,211,440
Patented Oct. 12, 1965

3,211,440
VAPORIZING APPARATUS FOR GENERATING A PROTECTIVE ATMOSPHERE FOR A FURNACE AND THE LIKE
George H. Slagle, Scotch Plains, N.J., assignor to Promet, Inc., Jersey City, N.J., a corporation of New Jersey
Filed Jan. 15, 1962, Ser. No. 166,267
4 Claims. (Cl. 266—2)

This invention relates to apparatus for generating a protective atmosphere in pyrometallurgical and electrometallurgical processes to accomplish a predetermined result, and to an improved method for achieving this end.

The utilization of a protective atmosphere to prevent, or substantially reduce, deleterious alteration of the composition, structure or surface condition of metals while in the fluid state, or during the treatment or working thereof at elevated temperatures, finds widespread applications in the field of metallurgy. Most generally, such an atmosphere acts to replace the air normally present in and about the metal confining structure, thereby substantially eliminating the undesirable effects produced in the metal by oxidation, carburization, decarburization or other detrimental change in the characteristics of the metal attributable to the free oxygen in the air. While numerous substances may be employed to accomplish this result, a particularly effective protective atmosphere for use in metallurgical processes involving both ferrous and non-ferrous metals can be produced with metallic lithium or a compound of lithium, and, although the apparatus of this invention can be utilized to generate substantially any type of protective vapor-containing atmosphere, it will be illustrated and described with reference to its especial utility in the generation of lithiated atmospheres.

Heretofore, metallurgical uses of lithium or lithium compound vapors to create protective atmospheres have, in the main, involved either (1) direct introduction of metallic lithium or a compound thereof into a furnace containing the metal undergoing treatment, or (2) vaporization of the lithium or lithium compound within a separate but connecting vaporizing furnace which utilizes a portion of the main furnace gases to entrain the vapors produced in the vaporizing furnace. Both techniques have important disadvantages, economic and otherwise. Attempts to provide a lithiated atmosphere by the direct introduction of lithium or lithium compounds in a pulverulent state into a furnace results in the major portion of the pulverulent material being swept through the furnace and vented to the atmosphere without reaching the vapor state. As a consequence, large volumes of these valuable materials are wasted. Installations employing the auxiliary furnace arrangement, while substantially reducing losses due to incomplete vaporization, are extremely cumbersome not only dimensionally speaking but also from the standpoint that substantial equipment is involved including, for example, a separate multiple burner system, recirculating conduit, precooling equipment, a heat exchanger, a recirculating pump, and valving, to accomplish the required result. A unit of such known character has limited utility. In addition, such a unit commonly relies on manual replenishment of the materials to be vaporized and is, therefore, incapable of supplying for prolonged periods an atmosphere of uniform character.

It is an object of this invention to provide an improved apparatus for the production of a protective atmosphere, which apparatus can be utilized in connection with substantially a variety of metallurgical processes.

It is also an object of this invention to provide an improved apparatus for generating a protective atmosphere, which apparatus is compact and which can be accurately and effectively controlled from a position remote from its point of utilization.

It is another object of this invention to provide an improved apparatus for generating a protective atmosphere, which apparatus can rapidly create an atmosphere of substantially any desired concentration at substantially any desired point of application.

It is still another object of this invention to provide an improved apparatus for automatically producing and maintaining a protective atmosphere for prolonged periods without the need for suspending operations to replenish the supply of the substance utilized in creating the atmosphere.

A still further object of this invention is to provide an improved apparatus for generating a protective atmosphere, which apparatus is not only inexpensive to manufacture but is also economical to operate.

Another object of this invention is to provide a novel and improved method of supplying a protective atmosphere to a metallurgical furnace or the like.

Other objects and advantages of the invention will appear as the description proceeds.

Briefly, the apparatus of this invention in its preferred aspects comprises a housing desirably having a removable cover member, the housing and cover member being provided with a suitable refractory lining defining a chamber having a substantially conoidal shape suggestive of the configuration of a beehive. The chamber is advantageously provided with an eccentrically or abaxially positioned inlet proximal to the base thereof for admitting, for example, a hot, essentially non-oxidizing gas such as argon or the like, or in the especially preferred aspects of this invention, a suitable ignited combustible gas. A container is situated within the housing for holding a substance to be vaporized by and entrained in the gas passing into the chamber through the inlet thereof. The unique shape of the chamber causes the combusted gas to swirl over the substance in the container with a screwlike or eddy-like motion, vaporizing the substance and entraining it as the gas follows an ever diminishing substantially corkscrew or spiral path toward the apex of the chamber. There, in a depressed state, it desirably passes through a substantially axially disposed outlet advantageously communicating through a conduit with the area where the vapor ladened gas will furnish the desired atmosphere. A burner desirably of the aspirated type is associated with the apparatus and may be conveniently and automatically regulated from a remote location by providing the apparatus with suitable pyrometer control means.

This invention will be more fully understood as the description proceeds in conjunction with the accompanying drawings wherein a particularly preferred, but not limiting, embodiment of the invention is shown and wherein:

FIG. 1 is a view in perspective of said embodiment of the apparatus of this invention;

FIG. 2 is a vertical sectional view taken on line 2—2 of FIG. 1;

FIG. 3 is a vertical sectional view taken on line 3—3 of FIG. 2;

FIG. 4 is a plan view of the apparatus illustrated in FIG. 1.

Referring now to the drawings, and in particular to FIGS. 1 and 2, the apparatus proper comprises a housing 10 desirably having a cover member 11 releasably attached thereto in any suitable manner. In the embodiment of the apparatus illustrated, this is advantageously accomplished by providing the housing 10 and the cover member 11 with complementary flanges 12 and 13, respectively. A gasket 14 is desirably positioned between the housing 10 and cover member 11, and secured in place by the flanges 12 and 13.

The housing 10 and the cover member 11 are each advantageously provided with a lining 15 preferably composed of a castable refractory material. Desirably the refractory material should be characterized by its ability to withstand high temperatures and to resist chemical corrosion. In addition to these properties, it is desirable that the refractory material be mechanically strong, be capable of withstanding sudden changes of temperature, have low porosity, and have a small coefficient of thermal expansion and contraction. There are numerous such materials possessing these characteristics to a greater or lesser extent, any of which may be conveniently utilized in the apparatus of this invention. Chromium oxide or magnesium oxide, or combinations thereof, are especially suitable, and have the added important advantage of being substantially resistant to attack by lithium or lithium compound vapors.

The material forming the lining 15 is especially desirably cast in the housing 10 and the cover member 11 in a manner to define a chamber 16. The shape of the chamber 16 may be generally frustro-conical and is especially advantageously substantially conoidal, or, more specifically, generally parabolodial, and is suggestive of the shape of a beehive. The advantages in utilizing a chamber of this configuration in the apparatus will be made clear hereinafter.

The chamber 16 is desirably provided with a diverging inlet 17 advantageously eccentrically or abaxially positioned proximal to the base thereof, and a substantially axially disposed outlet 18 desirably at the apex of the chamber. The diverging character of the inlet 17 and its location within the chamber 16 are conducive to a gradual expansion of the combusted gases entering the chamber 16 therethrough and serve to promote uninterrupted and continuous movement of the gases in the direction of the outlet 18. The outlet 18 may be suitably connected to a conduit 19 which communicates with a furnace or other area wherein the special atmosphere generated by the vaporizing apparatus is to be utilized.

Situated within the housing 10 and advantageously having its open face adjacent to the chamber 16 is a container or tray 20 adapted to hold a substance, for instance, a mixture of lithium chloride and lithium carbonate, preferably in stick form, to be vaporized by the apparatus. The dimensions of the tray 20 are desirably such that its contents will not be readily exhausted and will provide maximum exposure to the gases circulating through the chamber 16.

To insure that the tray 20 may readily be replenished so as to provide an adequate and constant supply of the substance to be vaporized, the housing 10 may be advantageously provided with an automatic feed or charging assembly designated at 21 and desirably comprising a slide or chute 22 having a shield or cover 23 affixed to its lower end. The cover 23 is adapted to receive a reciprocating block 24 having an opening 25 therein which serves as a reservoir for material to be charged into the tray 20. The block 24 desirably rides or slides on a plate 26 provided with an opening 27 which registers with one end of a hollow charge drop 28 positioned within the housing 10 in a manner to permit a charge 29 to fall into the tray 20. In operation, the chute 22 receives a supply of a substance to be vaporized by the apparatus. The substance or charge 29 desirably is in the form of a compressed unit mass of suitable dimensions. By way of illustration and not limitation, the charge 29 may comprise sticks composed of 60% lithium carbonate and 40% lithium chloride, the substantially cylindrical shape of which facilitates handling by the assembly 21. The charge 29 moves down the chute 22 and into the opening 25 of the block 24. The block 24 may then be actuated by a timing mechanism (not shown) in any manner known to the art to cause the opening 25 therein to register with opening 27 in plate 26. The charge 29 passes through charge drop 28 into tray 20. When the charging operation is completed, the block 24 is moved back into cover 23 where the opening 25 is again brought into registration with the chute 22.

In the event, for example, that the apparatus is employed under circumstances wherein utilization of the assembly 21 would not be feasible, access to the tray 20 may be desirably accomplished by providing the cover member 11 with a bore 30 having a threaded nipple 31 suitably fitted therein. The nipple 31 is preferably provided with a threaded closure cap 32 to close off the bore 30 during operation of the apparatus. Provision of such access means has the added advantage of permitting the tray 20 to be removed for cleaning or other servicing.

In a similar fashion, access to the conduit 19 via outlet 18 may be had through provision of a bore 33 in cover member 11. The bore 33 desirably is aligned with the outlet 18, and, as in the case of the bore 30, preferably is provided with a threaded nipple 34 and closure cap 35. This arrangement has the advantage of eliminating the necessity for removing the cover member 11 each time the conduit 19 may require servicing.

Referring now in particular to FIG. 3, the inlet 17 is advantageously connected to a burner of the aspirated type, a portion of which is shown and designated generally at 40. The conduit 41 of the burner arrangement desirably carries a combustible mixture of air and gas obtained from any convenient source and intimately mixed in any manner known to the art. The gas utilized may be any suitable hydrocarbon fuel, such as city gas, natural gas, propane or oil vapor. The air-gas mixture in the conduit 41 is desirably under pressure and is designed to flow therethrough at a rate and in an amount sufficient to produce a substantially continuous flow in the chamber 16 of combusted gas at a pre-selected temperature to achieve vaporization and entrainment of the substance in the tray 20. Operably connected to the conduit 41 is an ignition member which may be conveniently referred to as sparkplug 42. The plug 42 is advantageously connected to a source (not shown) of electric current which serves to ignite the combustible mixture coming from conduit 41. Associated with the plug 42 is a conventional flame rod 43 which functions as a safety device in a manner well known in the art. Regulation of temperature conditions within the chamber 16 may be advantageously achieved by providing a thermocouple 44, of any suitable type, for the apparatus. The operation of the entire system may be controlled and regulated from a remote location by means of a control cabinet assembly (not shown) operatively wired to all of the automatically functioning components of the system. By proper regulation from the control assembly, internal pressures and/or temperatures within the apparatus can be adjusted to provide for generation of substantially any desired amount of vapor.

The temperatures attained within the vaporizing apparatus will be dependent upon the capacity of the burner system in connection with which it is utilized. In one such system having a rating of 50,000 B.t.u., and employing air pressures ranging up to 30 ounces per square inch and gas pressures approaching 4½ ounces per square inch, vaporization temperatures ranging as high as 2,000° F. have been obtained. A temperature in this range is particularly suitable when the apparatus is employed, for example, in producing and maintaining a lithiated atmosphere.

In utilizing the apparatus of this invention, the typical embodiment thereof illustrated may be conveniently attached to the outer shell 45, for example, of a metallurical furnace by providing the housing 10 with a flanged collar 46 having a series of openings adapted to receive fastening means such as bolts 47. The furnace wall is desirably provided with a bore to receive the conduit 19.

The tray 20 may be filled with a substance to be vaporized and the burner system set into operation. As the combustible gas mixture passes the plug 42 it is ignited and the products of combustion enter the chamber 16 through inlet 17. The hot gas stream is directed and guided by the unique shape of the chamber 16 in a substantially helical path and as the hot gas stream swirls over the tray 20, the substance contained therein is vaporized by and entrained in the stream. The thus generated atmosphere is continuously depressed as it proceeds toward the apex of the chamber 16, and the passes it makes over the tray 20 become more frequent. As this activity continues, a richly vapor-laden atmosphere is formed which is ultimately expelled through the outlet 18 into conduit 19 from where it is channeled to a desired location within the metallurgical furnace.

The presence and approximate concentration of the vapors passing through the chamber 16 can be observed at any desired moment by advantageously providing an observation port 48 in the cover member 11 as illustrated in FIG. 1. The vapors, most generally, will have a characteristic color which can be detected by merely peering through the port 48, or by attaching the scope of a suitable sensing device, such as a spectrophotometer, thereto. The presence of lithium, for example, in the chamber 16 will be indicated by an easily recognized red color. Utilization of the port, therefore, considerably facilitates the correct control of feed into the tray 20.

The apparatus as described is capable of prolonged and sustained operation. In the event, however, that it is necessary for some reason to service the interior of the apparatus, the cover member 11 may be readily removed from the housing 10. Handles 49 are suitably fastened on the member 11 to expedite such action.

Over and above the significant advantages which have been described heretofore in relation to this invention, it may also be noted that the apparatus is extremely compact and comparatively small in size, attributes which contribute to its numerous and diverse uses in the metallurgical arts. The apparatus finds utility in connection with, for example, the production of oxygen-free metals, such as copper, aluminum, silver, and steel, and their alloys, and in foundry work and continuous metal casting operations. In addition it can be employed in the heat treatment of metals for mechanical working, annealing, normalizing, hardening, casting, forging, piercing, and the like.

While, for purposes of illustration, a preferred embodiment of this invention has been disclosed, other forms thereof may become apparent to those skilled in the art upon reference to this disclosure, and, therefore, this invention is to be limited only by the scope of the appended claims and prior art.

What I claim as new and desire to protect by Letters Patent of the United States is:

1. An apparatus for vaporizing a protective metallurgical atmosphere from a solid vaporizable metal-protecting material, comprising,
   a housing and a refractory lining disposed therein, said lining defining a laterally-directed chamber of generally conoidal shape,
   an inlet disposed abaxially and near the geometric base of said chamber and designed to admit therethrough a hot non-oxidizing gas,
   a container disposed near the bottom of said chamber and designed to hold a solid vaporizable metal-protecting material,
   an outlet disposed axially and at the apex of said chamber and leading to a metallurgical furnace, and
   means for forcing a hot gas through said inlet, whereby it is directed by the chamber wall into a swirling motion, thereby enabling it to vaporize and pick up vapors of protecting material from said container for a repeated number of times, so that it becomes highly laden with vapor prior to discharge through said outlet.

2. An apparatus for vaporizing a protective metallurgical atmosphere from a solid vaporizable metal-protecting material, comprising,
   a housing and a refractory lining disposed therein, said lining defining a laterally-directed chamber of generally conoidal shape,
   an inlet disposed in the upper portion of said chamber near the geometric base thereof and directed substantially at right angles to the axis of said chamber and designed to admit therethrough a hot non-oxidizing gas,
   a container disposed in said housing near the bottom of said chamber and designed to hold a solid vaporizable metal-protecting material,
   an outlet disposed axially and at the apex of said chamber and leading to a metallurgical furnace, and
   means for forcing a hot gas through said inlet, whereby it is directed by the chamber wall into a swirling motion, thereby enabling it to vaporize and pick up vapors of protecting material from said container for a repeated number of times, so that it becomes highly laden with vapor prior to discharge through said outlet.

3. An apparatus for vaporizing a protective metallurgical atmosphere from a solid vaporizable metal-protecting material comprising,
   a housing and a refractory lining defining a laterally-directed chamber of generally conoidal shape,
   an inlet disposed in the upper portion of said chamber near the geometric base thereof and directed substantially at right angles to the axis of said chamber and designed to admit therethrough a hot non-oxidizing gas,
   a container disposed in said housing below said chamber and designed to hold a vaporizable metal-protecting material,
   an outlet disposed axially and at the apex of said chamber and leading to a metallurgical furnace,
   a closeable opening near the top of said chamber designed for introduction of replenishing amounts of vaporizable material into said container, and
   means for forcing hot gas through said inlet, whereby it is directed by the chamber wall into a swirling motion, thereby enabling it to vaporize and pick up vapors of protecting material from said container for a repeated number of times, so that it becomes laden with vapor prior to discharge through said outlet.

4. An apparatus for vaporizing a protective metallurgical atmosphere, according to claim 3, and having
   a channel disposed over and leading to said closeable opening and designed to hold discrete pieces of vaporizable material to be fed through said opening.

References Cited by the Examiner

UNITED STATES PATENTS

| | | | |
|---|---|---|---|
| 2,181,093 | 11/39 | Ness | 148—16.7 |
| 2,320,149 | 5/43 | Lohausen | 23—281 |
| 2,346,698 | 4/44 | Ness | 148—16.5 |
| 2,489,459 | 11/49 | Ness et al. | 266—5 |
| 2,677,603 | 5/54 | Van Loon | 48—203 |
| 2,706,110 | 4/55 | Ness | 266—5 |
| 2,761,772 | 9/56 | Atwell | 48—203 |
| 2,852,346 | 9/58 | Austin | 23—259.5 X |

FOREIGN PATENTS 421,540　12/34　Great Britain.

JOHN F. CAMPBELL, *Primary Examiner.*

MORRIS O. WOLK, DELBERT E. GANTZ, *Examiners.*